United States Patent
Gallagher et al.

(10) Patent No.: US 9,790,797 B2
(45) Date of Patent: Oct. 17, 2017

(54) SUBSONIC SWEPT FAN BLADE

(75) Inventors: Edward J. Gallagher, West Hartford, CT (US); Thomas H. Rogers, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 1790 days.

(21) Appl. No.: 13/176,540

(22) Filed: Jul. 5, 2011

(65) Prior Publication Data

US 2013/0008170 A1    Jan. 10, 2013

(51) Int. Cl.
     *F01D 5/14*      (2006.01)
(52) U.S. Cl.
     CPC .......... *F01D 5/141* (2013.01); *F05D 2220/36* (2013.01); *F05D 2240/302* (2013.01); *F05D 2240/303* (2013.01); *Y02T 50/673* (2013.01)
(58) Field of Classification Search
     CPC ... F01D 5/14; F01D 5/141; F01D 5/12; F01D 5/145; F01D 5/147
     USPC ........ 416/238, 242, 243, 223 A, 223 R, 228, 416/DIG. 2, DIG. 5
     See application file for complete search history.

(56) References Cited

U.S. PATENT DOCUMENTS

| 3,989,406 | A | * | 11/1976 | Bliss ................................ 415/1 |
| 4,012,172 | A | | 3/1977 | Schwaar et al. |
| 5,167,489 | A | | 12/1992 | Wadia et al. |
| 5,209,643 | A | | 5/1993 | Cole |
| 5,228,833 | A | | 7/1993 | Schonenberger et al. |
| 5,348,256 | A | | 9/1994 | Parikh |
| 5,642,985 | A | * | 7/1997 | Spear et al. .................. 416/238 |
| 6,059,532 | A | * | 5/2000 | Chen et al. ............... 416/223 A |
| 6,071,077 | A | | 6/2000 | Rowlands |
| RE38,040 | E | | 3/2003 | Spear et al. |
| 7,374,403 | B2 | * | 5/2008 | Decker et al. ............ 416/223 R |
| 7,806,653 | B2 | | 10/2010 | Burton et al. |
| 2008/0181769 | A1 | * | 7/2008 | Wilson et al. ................ 415/181 |
| 2008/0226454 | A1 | * | 9/2008 | Decker et al. ................ 416/203 |

FOREIGN PATENT DOCUMENTS

| EP | 1111188 | 6/2001 |
| EP | 2080879 | 7/2009 |
| WO | WO 2007138779 A1 * | 12/2007 |

OTHER PUBLICATIONS

"Gears Put a New Spin on Turbofan Performance," published Nov. 5, 1998.*
European Search Report for European Patent Application No. 12174419 completed Aug. 25, 2016.

* cited by examiner

*Primary Examiner* — Justin Seabe
(74) *Attorney, Agent, or Firm* — Carlson, Gaskey & Olds, P.C.

(57) ABSTRACT

A gas turbine engine includes a spool, a turbine coupled to drive the spool, a propulsor coupled to be driven at a at a design speed by the turbine through the spool, and a gear assembly coupled between the propulsor and the spool. Rotation of the turbine drives the propulsor at a different speed than the spool. The propulsor includes a hub and a row of propulsor blades that extend from the hub. Each of the propulsor blades includes an airfoil body. The leading edge of the airfoil body has a swept profile such that, at the design speed, a component of a relative velocity vector of a working gas that is normal to the leading edge is subsonic along the entire radial span.

10 Claims, 5 Drawing Sheets

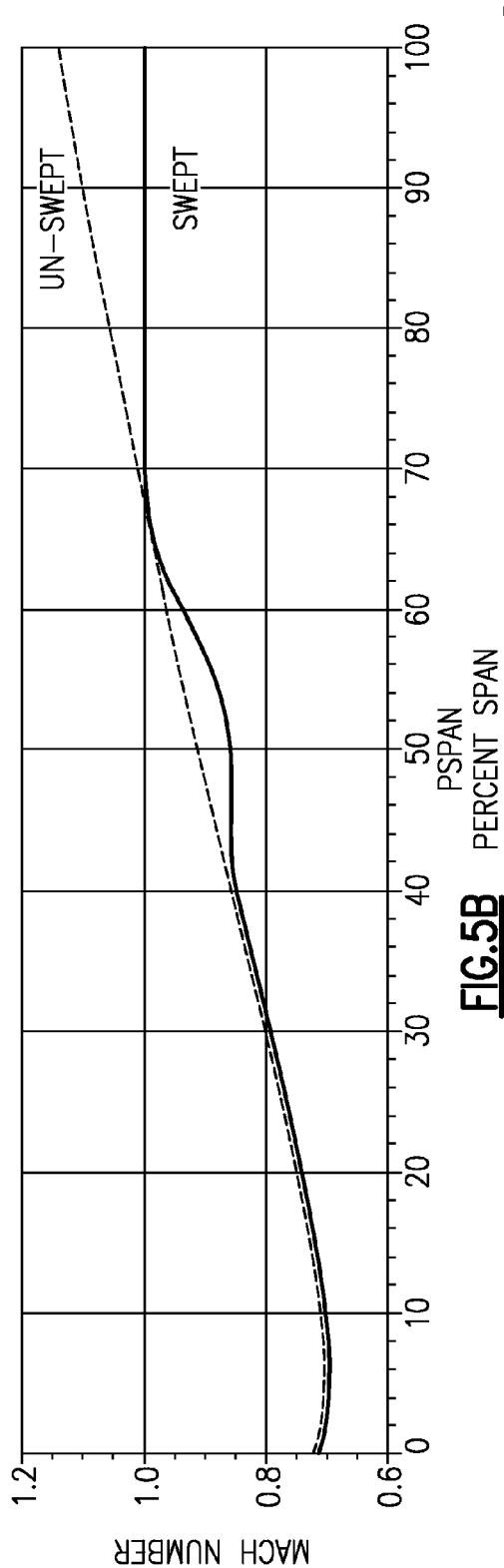
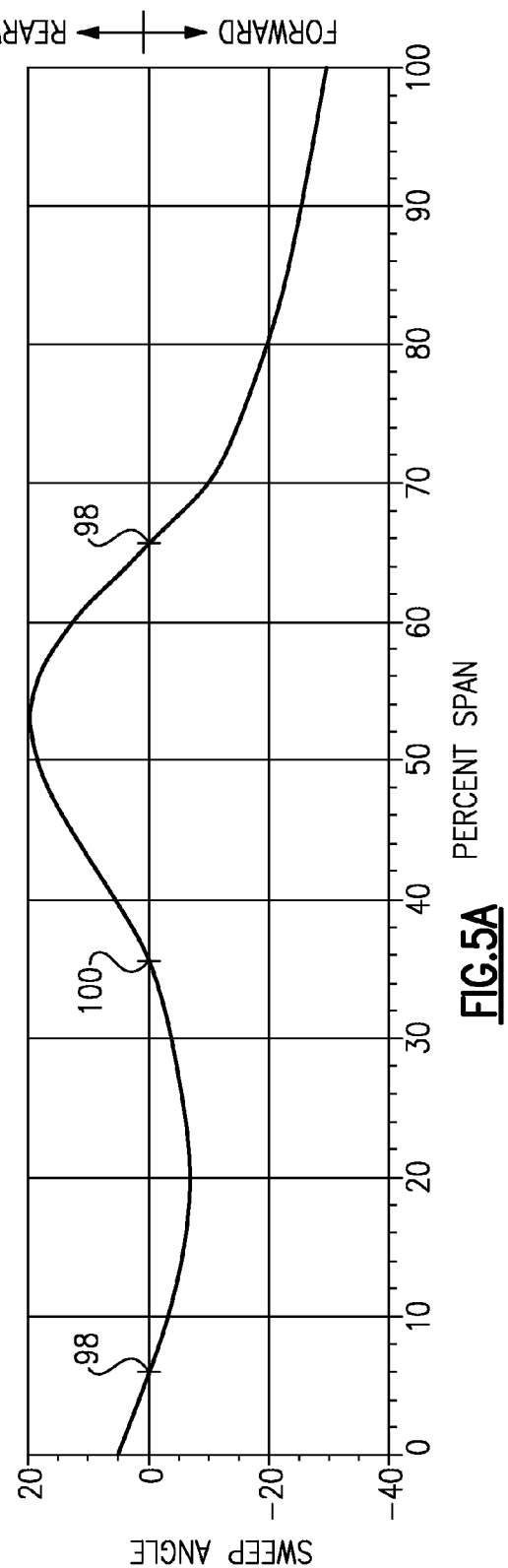
FIG.5A
FIG.5B

US 9,790,797 B2

SUBSONIC SWEPT FAN BLADE

STATEMENT REGARDING FEDERALLY SPONSORED RESEARCH OR DEVELOPMENT

This invention was made with government support under contract number NAS3-01138 awarded by NASA. The government has certain rights in the invention.

BACKGROUND

This disclosure relates to gas turbine engines and, more particularly, to an engine having a geared turbofan architecture that is designed to operate with a high bypass ratio and a low pressure ratio.

The propulsive efficiency of a gas turbine engine depends on many different factors, such as the design of the engine and the resulting performance debits on the fan that propels the engine. As an example, the fan rotates at a high rate of speed such that air passes over at least the outer portion of the blades at transonic or supersonic speeds. The fast-moving air creates flow discontinuities or shocks that result in irreversible propulsive losses. Additionally, physical interaction between the fan and the air causes downstream turbulence and further losses. Although some basic principles behind such losses are understood, identifying and changing appropriate design factors to reduce such losses for a given engine architecture has proven to be a complex and elusive task.

SUMMARY

Disclosed is a gas turbine engine and propulsor. The gas turbine engine includes a spool, a turbine coupled to drive the spool, the propulsor coupled to be driven at a at a design speed by the turbine through the spool, and a gear assembly coupled between the propulsor and the spool. Rotation of the turbine drives the propulsor at a different speed than the spool.

The propulsor includes an airfoil body that extends in a span direction between a root and a tip, in a chord direction between a leading edge and a trailing edge and in a thickness direction between a pressure side and a suction side. The leading edge has a swept profile such that, at the design speed, a component of a relative velocity vector of a working gas that is normal to the leading edge is subsonic along the entire span. The subsonic flow facilitates the avoidance of flow discontinuities or shocks that result in irreversible propulsive losses.

Also disclosed is a method for enhancing efficiency of a propulsor in a gas turbine engine. The method includes determining a design speed of rotation of a propulsor and establishing the leading edge of the propulsor to have a swept profile such that, at the design speed, a component of a relative velocity vector of a working gas that is normal to the leading edge is subsonic along the entire span.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 5A shows a profile of sweep angle versus percent span.

FIG. 5B shows a profile of Mach number of a component of a relative velocity vector $V_r$ of air that is normal to the leading edge versus percent span for the profile of FIG. 5A.

DETAILED DESCRIPTION

In a turbofan engine, the fan (e.g., propulsor) rotates at a high rate in the relative frame of reference. Particularly in the outboard region of the fan blades, the air passes over the blades at supersonic speed and creates flow shocks that result in efficiency losses. In a turbofan engine architecture where the turbine of the engine directly drives the fan at the same angular speed as the turbine, the blades are designed with a swept profile to reduce the air speed closer to the speed of sound. However, because of the high speed fan rotation, the air speed over the blades remains supersonic, or transonic at best, in engine architectures where the turbine of the engine directly drives the fan at the same angular speed as the turbine.

As will be described, a disclosed gas turbine engine 20 incorporates a geared architecture and a propulsor 42 with blades 74 that are designed with a swept profile that generates subsonic air speeds over the entire span of the propulsor blades 74, where the same blades, if unswept, would generate transonic or supersonic air speeds over at least a portion of the span.

Figure 1:
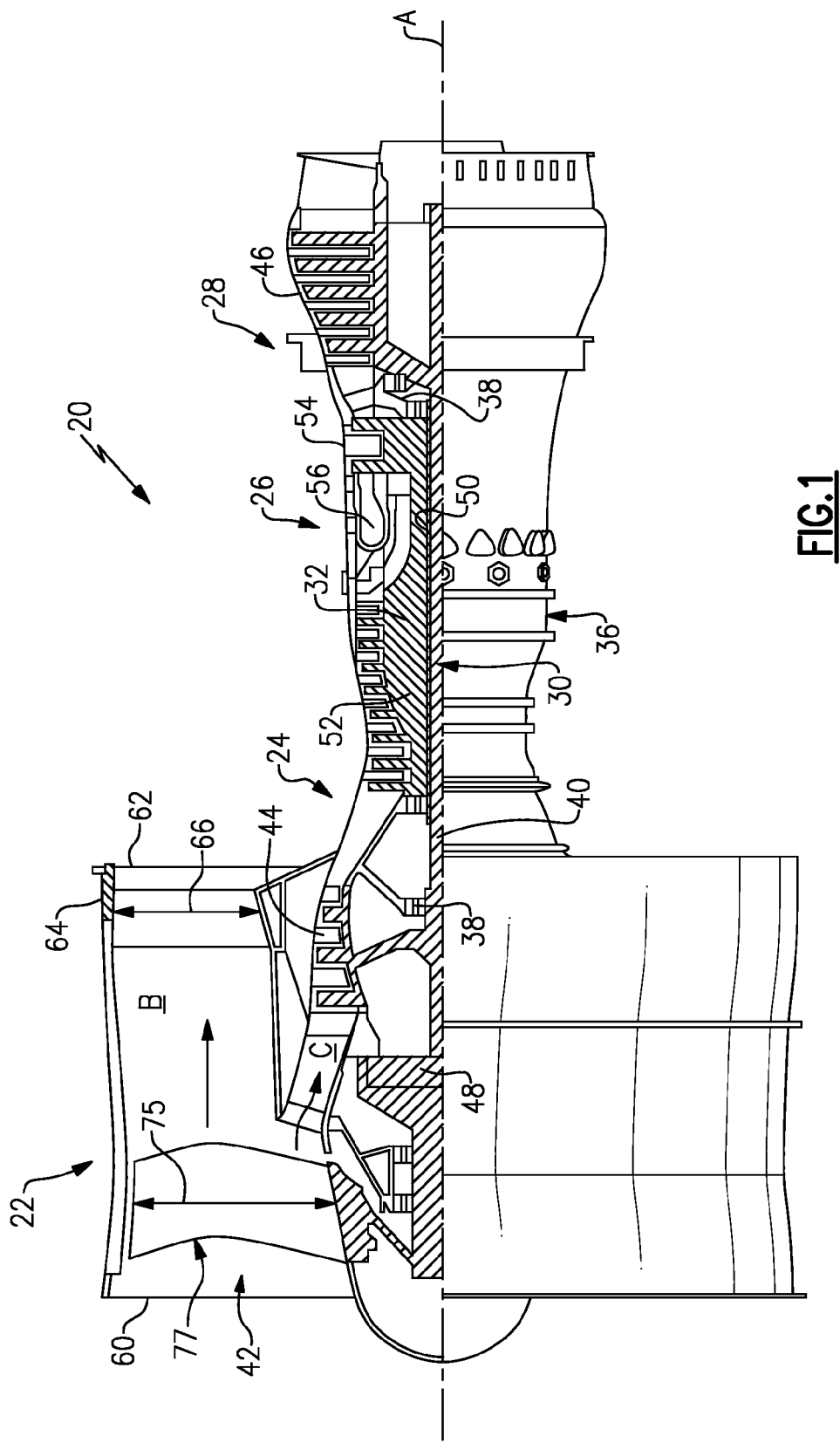
FIG. 1 is a schematic cross-section of a gas turbine engine.

FIG. 1 schematically illustrates the gas turbine engine 20. The gas turbine engine 20 may be a two-spool turbofan that generally incorporates a fan section 22, a compressor section 24, a combustor section 26 and a turbine section 28. Although depicted as a turbofan gas turbine engine, it is to be understood that the concepts described herein are not limited to use with the disclosed arrangement. Alternative engine architectures may include a single-spool design, a three-spool design, or an open rotor design, among other systems or features.

The fan section 22 drives air along a bypass flow passage B while the compressor section 24 drives air along a core flow passage C for compression and communication into the combustor section 26. The engine 20 includes a low speed spool 30 and high speed spool 32 mounted for rotation about an engine central longitudinal axis A relative to an engine static structure 36 via several bearing systems 38. The fan section 22 and the compressor section 24 are concentric with the engine central longitudinal axis A.

The low speed spool 30 generally includes an inner shaft 40 that is coupled with the propulsor 42, a low pressure compressor 44 and a low pressure turbine 46. The low pressure turbine 46 drives the propulsor 42 through the inner shaft 40 and a gear assembly 48, which allows the low speed spool 30 to drive the propulsor 42 at a different (e.g. lower) angular speed. The lower speed allows the propulsor blades 74 to be designed with a different sweep profile than would be used for other engine architectures that do not employ a geared architecture, to achieve subsonic flow along the entire blade span.

The high speed spool 32 includes an outer shaft 50 that is coupled with a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A, which is collinear with their longitudinal axes.

A core airflow in core flow passage C is compressed in the low pressure compressor 44 then the high pressure compressor 52, mixed with the fuel and burned in the combustor 56, and then expanded over the high pressure turbine 54 and low pressure turbine 46. The turbines 54, 46 rotationally drive the respective low speed spool 30 and high speed spool 32 in response to the expansion.

As shown, the propulsor 42 is arranged at an inlet 60 of the bypass flow passage B and the core flow passage C. Air flow through the bypass air passage B exits the engine 20 through an outlet 62 or nozzle. For a given design of the propulsor 42, the inlet 60 and the outlet 62 establish a design pressure ratio with regard to an inlet pressure at the inlet 60 and an outlet pressure at the outlet 62 of the bypass flow passage B. As an example, the design pressure ratio may be determined based upon the stagnation inlet pressure and the stagnation outlet pressure at a design rotational speed of the engine 20. In that regard, the engine 20 may optionally include a variable area nozzle 64 within the bypass flow passage B. The variable area nozzle 64 is operative to change a cross-sectional area 66 of the outlet 62 to thereby control the pressure ratio via changing pressure within the bypass flow passage B. The design pressure ratio may be defined with the variable area nozzle 64 fully open or fully closed.

Figure 2:
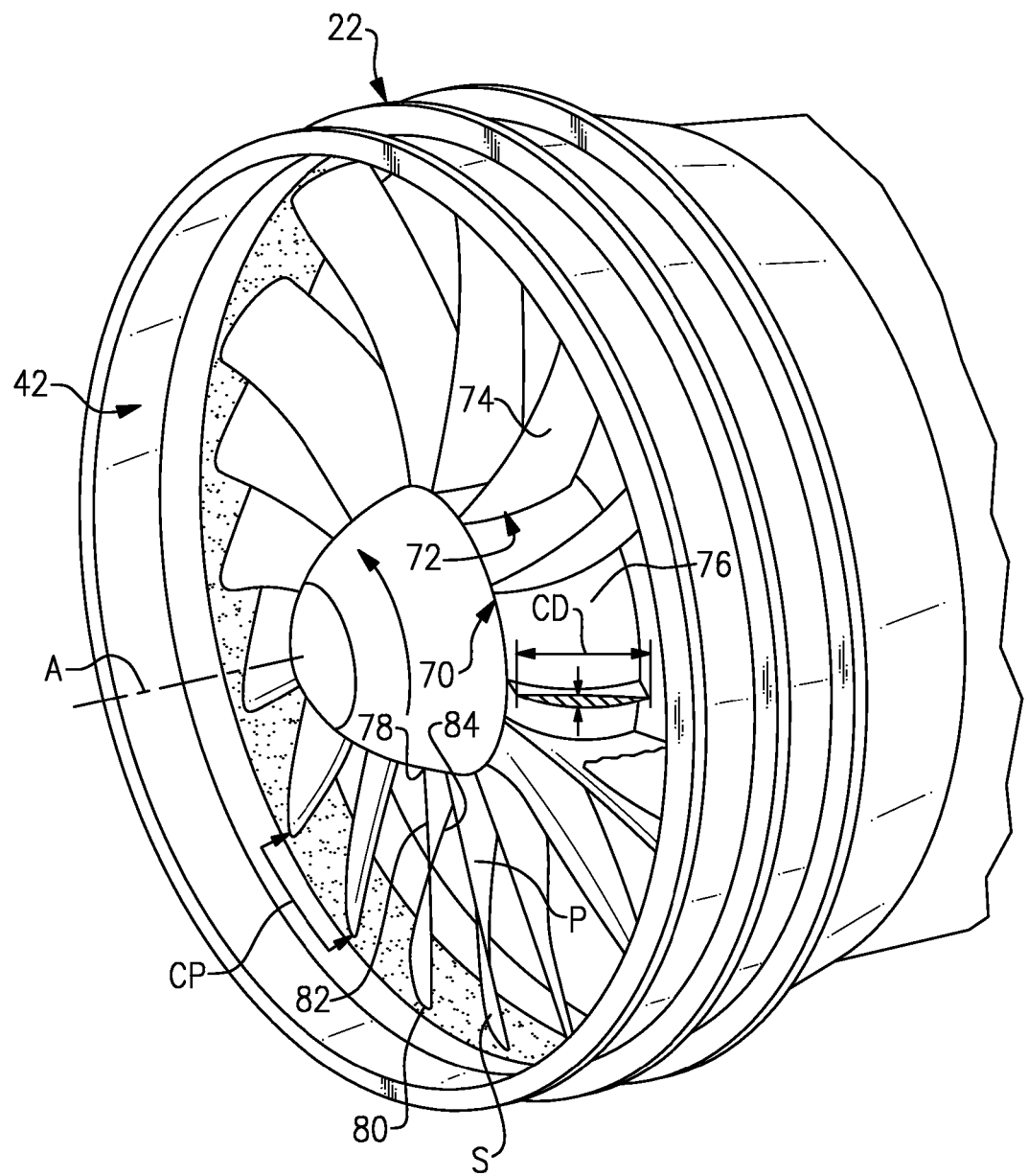
FIG. 2 is a perspective view of a fan section of the engine of FIG. 1.

Referring to FIG. 2, the propulsor 42, which in this example is a fan, includes a rotor 70 having a row 72 of propulsor blades 74 that extend circumferentially around a hub 76. Each of the propulsor blades 74 includes an airfoil body that extends in a radial span 75 (FIG. 1) from a hub 76 between a root 78 and a tip 80, in a chord direction (axially and circumferentially) between a leading edge 82 and a trailing edge 84 and in a thickness direction between a pressure side P and a suction side S. A chord, represented by chord dimension (CD), is a straight line that extends between the leading edge 82 and the trailing edge 84 of the propulsor blade 74. The chord dimension (CD) may vary along the span of the propulsor blade 74. The row 72 of propulsor blades 74 also defines a circumferential pitch (CP) that is equivalent to the arc distance between the tips 80 of neighboring propulsor blades 74.

Figure 3:
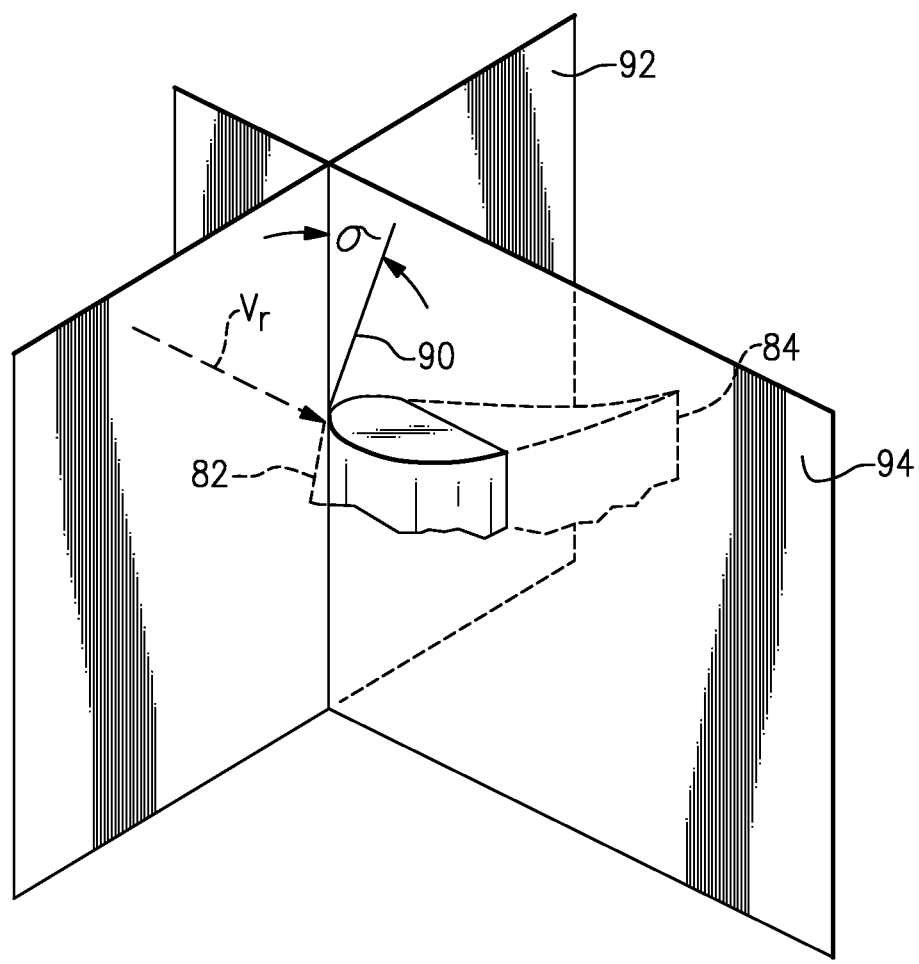
FIG. 3 is a schematic view of a portion of a propulsor blade to describe a swept profile and sweep angle.

FIG. 3 shows a portion of one of the propulsor blades 74 to describe a swept profile (e.g., FIG. 1, swept profile 77) and sweep angle. At a design speed of the propulsor 42, such as full throttle, the propulsor 42 receives a working gas (e.g., air). The design speed may be determined in a known manner based on the design of the engine 20. The axial velocity of the incoming air is substantially constant across the span 75. The linear velocity of the rotating propulsor blade 74 increases from the root 78 to the tip 80. A component of a relative velocity vector $V_r$ of the air that is normal to the leading edge 82 increases from the root 78 to the tip 80 and, at high enough rotational speeds for an unswept blade, can be supersonic.

A sweep angle σ at any arbitrary position along the span 75 is the acute angle between a line 90 tangent to the leading edge 82 and a plane 92 perpendicular to the component of the relative velocity vector $V_r$ that is normal to the leading edge 82. The sweep angle σ is measured in plane 94, which includes both the component of the relative velocity vector $V_r$ that is normal to the leading edge 82 and the tangent line 90 and is perpendicular to plane 92.

Figure 4B:
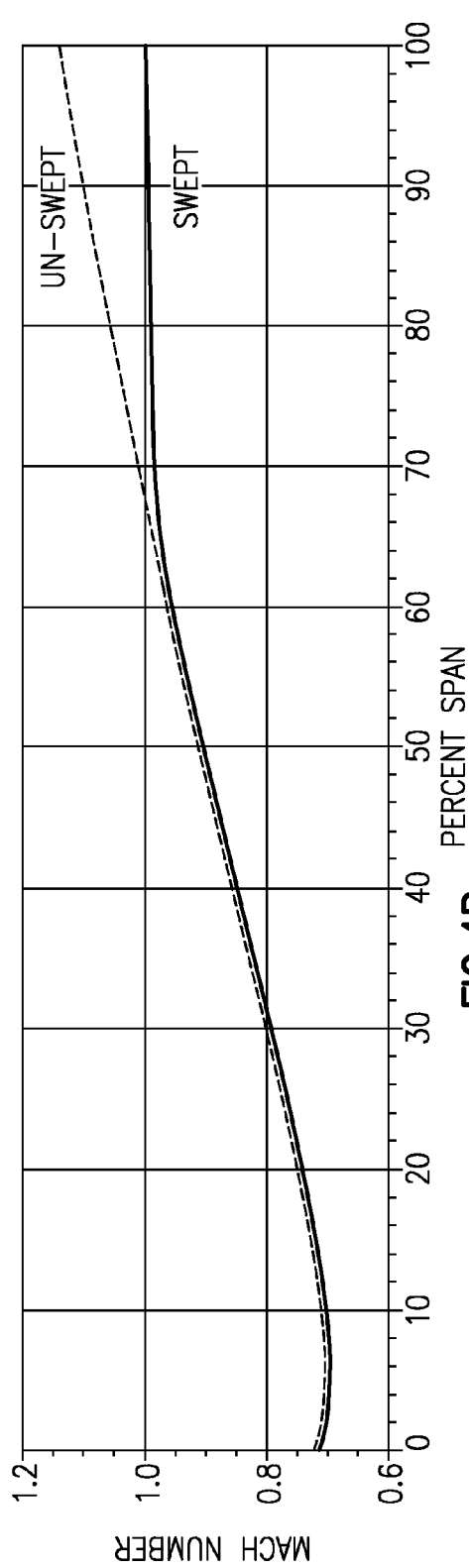
FIG. 4B shows a profile of Mach number of a component of a relative velocity vector $V_r$ of air that is normal to the leading edge versus percent span for the profile of FIG. 4A.
Figure 4A:
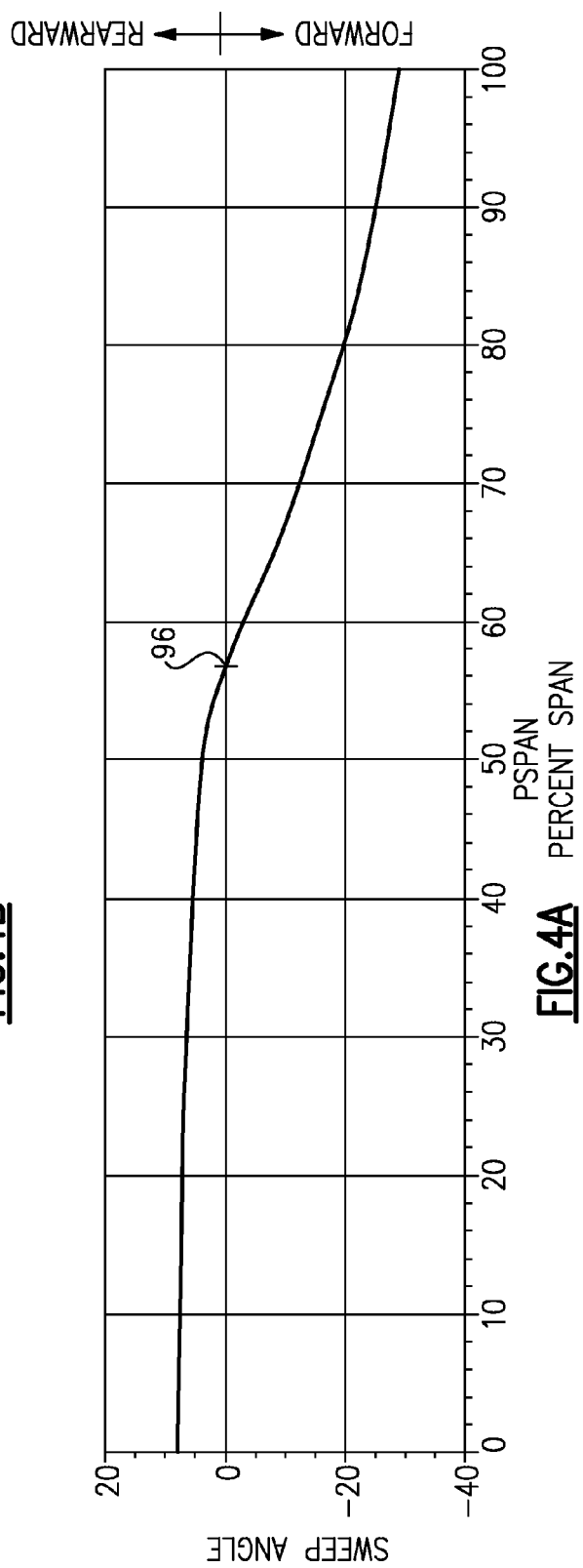
FIG. 4A shows a profile of sweep angle versus percent span.

The propulsor blades 74 have a swept profile such that, at the design speed, the component of the relative velocity vector $V_r$ that is normal to the leading edge 82 is subsonic along the entire radial span 75. FIG. 4A shows an example swept profile of sweep angle σ versus percent span, and FIG. 4B shows the Mach Number of the component of the relative velocity vector $V_r$ that is normal to the leading edge 82 for the profile of FIG. 4A. The left side of 0% span is at the root 78 and the right side at 100% span is at the tip 80. In this embodiment, the swept profile has a rearward sweep from 0% to at least 50% of the radial span. For instance, the sweep angle σ decreases from 0% to at least 50% of the radial span and is less than 15°. The rearward sweep in this region has a sweep angle between 5° and 10°. It is to be understood that relative positional terms, such as such as "rearward," "forward" and the like, are used with reference to the normal orientation of the engine 20.

The swept profile also has a forward sweep from at least 60% to 100% of the radial span. In the example, the swept profile has a single, exclusive transition 96 between the rearward sweep and the forward sweep from 0% to 100% of the radial span. In embodiments, the transition is between 50% and 60% of the radial span and may nominally be between 55% and 60%.

The amount of rearward sweep may be represented as a percentage $S_{REAR}$ of the total radial span and the amount of forward sweep may be represented as a percentage $S_{FOR}$ of the total radial span. In embodiments, a ratio of $S_{REAR}/S_{FOR}$ ($S_{REAR}$ divided by $S_{FOR}$) is between 0.67 and 1.5. For instance, each of $S_{REAR}$ and $S_{FOR}$ is between 40% and 60% such that $S_{REAR}$ plus $S_{FOR}$ equals 100%. In further embodiments, the ratio of $S_{REAR}/S_{FOR}$ may be between 1.0 and 1.5 and may nominally be between 1.25 and 1.30.

FIG. 5A shows another example swept profile of sweep angle σ versus percent span to achieve subsonic flow along the entire radial span 75, and FIG. 5B shows the Mach Number of the component of the relative velocity vector $V_r$ that is normal to the leading edge 82 for the profile of FIG. 5A. In this example, the swept profile has three, exclusive transitions between rearward sweep and forward sweep from 0% to 100% of the radial span. For instance, moving from the 0% at the root 78 toward 100% at the tip 80, the three transitions include two transitions 98 from rearward sweep to forward sweep and one transition 100 from forward sweep to rearward sweep.

Additional embodiments of the propulsor blades 74 may also include some or all of the below-described properties in combination with the disclosed sweep profile for achieving a subsonic blade.

In embodiments, the propulsor 42 may include a number (N) of the propulsor blades 74 in the row 72 that is no more than 20. For instance, the number N may be any number from 10 to 20.

Additionally, the propulsor blades 74 define a solidity value with regard to the chord dimension CD at the tips 80 and the circumferential pitch CP. The solidity value is defined as a ratio (R) of CD/CP (i.e., CD divided by CP). In embodiments, the solidity value of the propulsor 42 is between 0.6 and 1.3.

The engine 20 may also be designed with a particular design pressure ratio. In embodiments, the design pressure ratio may be between 1.1 and 1.55.

The engine 20 may also be designed with a particular bypass ratio with regard to the amount of air that passes through the bypass flow passage B and the amount of air that passes through the core flow passage C. As an example, the design bypass ratio of the engine 20 may nominally be 12 or greater.

The propulsor 42 also defines a ratio of N/R. In embodiments, the ratio N/R is between 8 and 28. Tables 1 and 2 below show additional examples of solidity and the ratio N/R for different numbers of propulsor blades 74 that can be used with the disclosed sweep profile.

TABLE 1

Number of Blades, Solidity and Ratio N/R

| Number of Blades (N) | Solidity | Ratio N/R |
|---|---|---|
| 20 | 1.3 | 15.4 |
| 18 | 1.3 | 13.8 |
| 16 | 1.3 | 12.3 |
| 14 | 1.3 | 10.8 |
| 12 | 1.3 | 9.2 |
| 20 | 1.2 | 16.7 |
| 18 | 1.2 | 15.0 |
| 16 | 1.2 | 13.3 |
| 14 | 1.2 | 11.7 |
| 12 | 1.2 | 10.0 |
| 20 | 1.1 | 18.2 |
| 18 | 1.1 | 16.4 |
| 16 | 1.1 | 14.5 |
| 14 | 1.1 | 12.7 |
| 12 | 1.1 | 10.9 |
| 20 | 1.0 | 20.0 |
| 18 | 1.0 | 18.0 |
| 16 | 1.0 | 16.0 |
| 14 | 1.0 | 14.0 |
| 12 | 1.0 | 12.0 |

TABLE 2

Number of Blades, Solidity and Ratio N/R

| Number of Blades (N) | Solidity | Ratio N/R |
|---|---|---|
| 16 | 1.1 | 14.5 |
| 14 | 1.1 | 12.7 |
| 12 | 1.1 | 10.9 |
| 10 | 1.1 | 9.1 |
| 16 | 1.02 | 15.7 |
| 14 | 1.02 | 13.7 |
| 12 | 1.02 | 11.8 |
| 10 | 1.02 | 9.8 |
| 16 | 0.89 | 18.0 |
| 14 | 0.89 | 15.7 |
| 12 | 0.89 | 13.5 |
| 10 | 0.89 | 11.2 |
| 16 | 0.76 | 21.1 |
| 14 | 0.76 | 18.4 |
| 12 | 0.76 | 15.8 |
| 10 | 0.76 | 13.2 |
| 16 | 0.63 | 25.4 |
| 14 | 0.63 | 22.2 |
| 12 | 0.63 | 19.0 |
| 10 | 0.63 | 15.9 |
| 16 | 0.60 | 26.7 |
| 14 | 0.60 | 23.3 |
| 12 | 0.60 | 20.0 |
| 10 | 0.60 | 16.7 |

The disclosed ratios of N/R also enhance the propulsive efficiency of the disclosed engine 20. For instance, the disclosed ratios of N/R are designed for the geared turbofan architecture of the engine 20 that utilizes the gear assembly 48. That is, the gear assembly 48 allows the propulsor 42 to rotate at a different, lower speed than the low speed spool 30. In combination with the variable area nozzle 64, the propulsor 42 can be designed with a large diameter and rotate at a relatively slow speed with regard to the low speed spool 30. A relatively low speed, relatively large diameter, and the geometry that permits the disclosed ratios of N/R contribute to the reduction of performance debits, such as by lowering the speed of the air or fluid that passes over the propulsor blades 74.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a spool;
   a turbine coupled with said spool;
   a propulsor coupled to be rotated at a design speed about an axis by said turbine through said spool; and
   a gear assembly coupled between said propulsor and said spool such that rotation of said turbine drives said propulsor at a different speed than said spool,
   wherein said propulsor includes a hub and a row of propulsor blades that extend from said hub, each of said propulsor blades includes an airfoil body that extends in a radial span between a root and a tip, in a chord direction between a leading edge and a trailing edge and in a thickness direction between a pressure side and a suction side, said leading edge of the airfoil body has a swept profile such that, at the design speed, a component of a relative velocity vector of a working gas that is normal to the leading edge is subsonic along the entire radial span,
   wherein said swept profile has a rearward sweep from 0% to at least 50% of the radial span and a forward sweep from at least 60% to 100% of said radial span, with said root being at 0% of said radial span and said tip being at 100% of said radial span, said rearward sweep has a sweep angle of less than 15°, and said swept profile has a single, exclusive transition between a rearward sweep and a forward sweep from 0% to 100% of said radial span.

2. The gas turbine engine as recited in claim 1, wherein said rearward sweep has a sweep angle that decreases from 0% to at least 50% of said radial span.

3. The gas turbine engine as recited in claim 1, wherein said rearward sweep has a sweep angle between 5° and 10° from 0% to 50% of said radial span.

4. The gas turbine engine as recited in claim 1, wherein said transition is between 50% and 60% of said radial span.

5. The gas turbine engine as recited in claim 1, wherein said transition is between 55% and 60% of said radial span.

6. The gas turbine engine as recited in claim 1, wherein a percentage $S_{REAR}$ of said radial span is said rearward sweep and a percentage $S_{FOR}$ of the radial span is said forward sweep, and a ratio of $S_{REAR}/S_{FOR}$ is between 0.67 and 1.5.

7. The gas turbine engine as recited in claim 6, wherein said ratio is between 1.25 and 1.30.

8. The gas turbine engine as recited in claim 1, wherein said design speed is at full throttle.

9. The gas turbine engine as recited in claim 1, wherein said propulsor includes a number (N) of said propulsor blades in the row that is no more than 20, said propulsor blades have a solidity value with regard to a chord dimension (CD) at the tips and a circumferential pitch (CP), and said solidity value is a ratio (R) of CD/CP that is between 0.6 and 1.3.

10. The gas turbine engine as recited in claim 9, wherein a ratio N/R is between 8 and 28.

\* \* \* \* \*